(12) United States Patent
Inaba (10) Patent No.: US 11,878,536 B2
(45) Date of Patent: Jan. 23, 2024

(54) PRINTER

(71) Applicant: Toshiba Tec Kabushiki Kaisha, Tokyo (JP)

(72) Inventor: Hiroyuki Inaba, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/705,050

(22) Filed: Mar. 25, 2022

(65) Prior Publication Data

US 2023/0302820 A1   Sep. 28, 2023

(51) Int. Cl.
*B41J 2/36*   (2006.01)
*G06K 15/02*   (2006.01)

(52) U.S. Cl.
CPC .............. *B41J 2/36* (2013.01); *G06K 15/028* (2013.01)

(58) Field of Classification Search
CPC ................................ B41J 2/36; G06K 15/028
See application file for complete search history.

(56) References Cited

FOREIGN PATENT DOCUMENTS

| JP | H11129547 A | * | 5/1999 | ................ B41J 3/12 |
| JP | 2002-103757 A | | 4/2002 | |
| JP | 2002103757 A | * | 4/2002 | ............. B41J 29/46 |

* cited by examiner

*Primary Examiner* — Yaovi M Ameh
(74) *Attorney, Agent, or Firm* — FOLEY & LARDNER LLP (57) ABSTRACT

A printer includes a printer head configured to operate in a normal mode for printing print data on a medium with at least one of a designated size or a designated thickness of a character, and a size change mode or a thickness change mode for printing the print data on the medium with a size or thickness of the character being greater than the designated size or the designated thickness, respectively. The printer also includes a sensor configured to detect a printing density of a printing pattern. The printer also includes a processor configured to acquire print data, print the printing pattern, the printing pattern being set in advance, and set an operation mode of the printer head to one of the size change mode or the thickness change mode.

9 Claims, 11 Drawing Sheets

| No | SIZE |
|---|---|
| 1 | 8P |
| 2 | 10P |
| ... | ... |
| 10 | 26P |

| No | THICKNESS |
|---|---|
| 1 | EXTREMELY THICK |
| 2 | THICK |
| 3 | NORMAL |
| 4 | THIN |
| 5 | EXTREMELY THIN |

PRINTER

FIELD

Embodiments described herein relate to a printer.

BACKGROUND

Printers that print on media such as paper are used in a wide range of fields. For example, a thermal printer that is installed in a point of sales (POS) terminal and prints a receipt is known.

In recent years, further types of paper for printing is being used. For example, for the thermal printer for printing a receipt (hereinafter, also referred to as a "receipt printer"), low-cost heat sensitive paper, heat sensitive paper having a low environmental load or the like is used. Since the optimal printing conditions differ depending on paper characteristics, there is a problem that some low-cost paper shows insufficient printing density and it makes the printed characters unreadable.

In order to solve such a problem, in the receipt printer, the temperature of a thermal head is controlled in accordance with the paper used to make the printing density consistent. In order to make the printing density consistent, complicated control such as temperature control of the thermal head is required. Therefore, it is desired that the visibility of the printed characters can be easily ensured even if users change the paper for their operation.

DETAILED DESCRIPTION

In general, according to an exemplary, non-limiting embodiment, a printer includes a printer head, a sensor, and a processor. The printer head is configured to operate in a normal mode for printing print data on a medium with at least one of a designated size or a designated thickness of a character. The printer head is also configured to operate in a size change mode or a thickness change mode for printing the print data on the medium with a size or thickness of the character being greater than the designated size or the designated thickness, respectively. The sensor is configured to detect a printing density of a printing pattern printed on the medium. The processor is configured to acquire print data, control the printer head and print the printing pattern on the medium, the printing pattern being set in advance, and in response to detecting the printing density being lower than a printing density set in advance, set an operation mode of the printer head to one of the size change mode or the thickness change mode.

Figure 1:
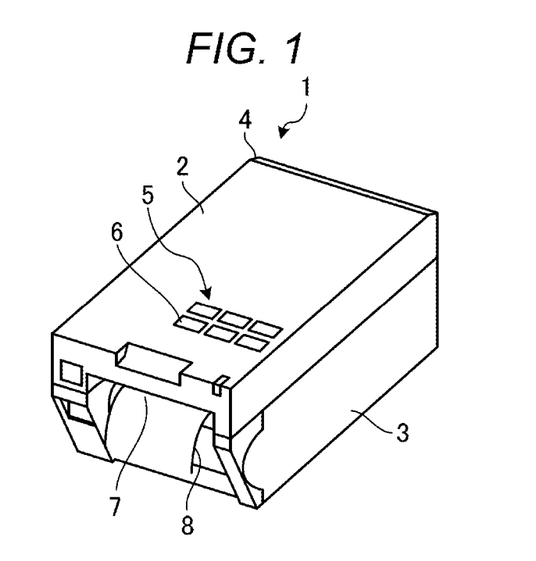
FIG. 1 is a perspective view illustrating a printer, according to an exemplary embodiment.

Hereinafter, a printer according to at least one exemplary, non-limiting embodiment is described with reference to the drawings. FIG. 1 is a perspective view illustrating the printer 1, according to an exemplary embodiment. The printer 1 is a thermal printer. In particular embodiments, the printer 1 is a receipt printer that is connected to an external device (a POS terminal in the present embodiment) (not illustrated) and prints a receipt based on print data provided by the POS terminal. In some embodiments, the printer 1 prints transaction data, a store logo, an advertisement, and the like on a heat sensitive paper (hereinafter, also referred to as paper) stored inside and issues the paper as a receipt. However, this is an example of the way of using the printer 1, and the printer 1 may be used in other fields.

The printer 1 includes an upper housing 2 and a lower housing 3. The upper housing 2 is rotatably provided on the lower housing 3 with one end side 4 as an axis (e.g., a reference plane, etc.). If the upper housing 2 is rotated in the state illustrated in FIG. 1, the inside of the printer 1 is opened.

An operation unit 5 is provided on the upper surface of the upper housing 2. The operation unit 5 includes a plurality of operation buttons 6. The operation buttons 6 include a button for turning on and off the power, a button for prohibiting automatic switching of the operation mode of a printing unit described below, a button for manually switching the operation mode of the printing unit, and the like. The operation unit 5 inputs various kinds of information to a control unit by operating these operation buttons 6 by a user. Further, the printer 1 includes a dispensing port 7. The dispensing port 7 discharges a receipt 8 printed from the inside of the printer 1 to the outside.

Figure 2:
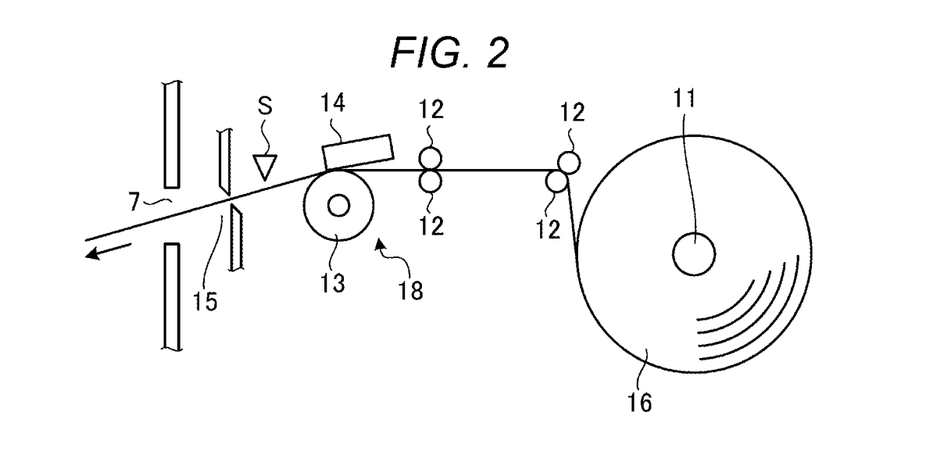
FIG. 2 is a schematic diagram illustrating an internal configuration of the printer, according to an exemplary embodiment.

FIG. 2 is a schematic diagram illustrating an internal configuration of the printer 1, according to an exemplary embodiment. As illustrated in FIG. 2, the printer 1 includes a holding portion 11, a plurality of guide rollers 12, a platen 13, a thermal head 14, a cutter 15 including a pair of blades, a sensor S, and the like, therein.

The holding portion 11 holds paper 16 wound in a rotatable roll shape. The paper 16 is an example of a medium on which print data is printed. The guide rollers 12 guide the paper 16 unwound from the holding portion 11 to a portion between the platen 13 and the thermal head 14. Two guide rollers 12 are provided in a conveyance path from the holding portion 11 to the platen 13 and the thermal head 14.

The platen 13 conveys the paper 16 by rotating with a conveyance motor 17 (see FIG. 3) as a drive source in a state of sandwiching the paper 16 together with the thermal head 14. The conveyance motor 17 is configured with, for example, a stepping motor. A conveyance unit 18 that conveys the paper 16 is configured with the platen 13 and the conveyance motor 17.

The thermal head 14 (e.g., a printer head, etc.) is a line thermal head provided with a plurality of heating elements on a line in a direction orthogonal to a conveyance direction of the paper 16 (direction orthogonal to the paper surface in FIG. 2). In addition, the thermal head 14 is urged toward the platen 13 with a predetermined pressing force. The thermal head 14 heats the heating elements and applies heat energy to the paper 16 to print on the paper 16 conveyed by the conveyance unit 18. The thermal head 14 is an example of the printing unit.

The cutter 15 is formed by combining flat plate-like fixed and movable blades which have the same shape, and the movable blade slides with respect to the fixed blade, so that the paper 16 conveyed by the conveyance unit 18 can be cut at any position. In FIG. 2, the fixed blade is provided in the upper portion of the drawing, and the movable blade is provided in the lower portion of the drawing. The movable blade is driven by a cutter motor 19 (see FIG. 3) and can be moved in a vertical direction of FIG. 2. In particular embodiments, the movable blade is normally positioned in the lower portion so that the paper 16 passes between the movable blade and the fixed blade and moves to the upper portion when cutting the paper 16. The paper 16 cut by the cutter 15 is dispensed from the dispensing port 7 as the receipt 8.

The sensor S detects the printing density of the printing pattern printed during test printing. The sensor S includes a light emitting portion and a light receiving portion. The light receiving portion receives light that is emitted by the light emitting portion and reflected on the printing surface of the paper 16. The sensor S detects a printing density in response to the amount of light received by the light receiving portion, that is, the amount of light reflected on the printing surface subjected to the printing. The sensor S is an example of a detecting unit.

Figure 3:
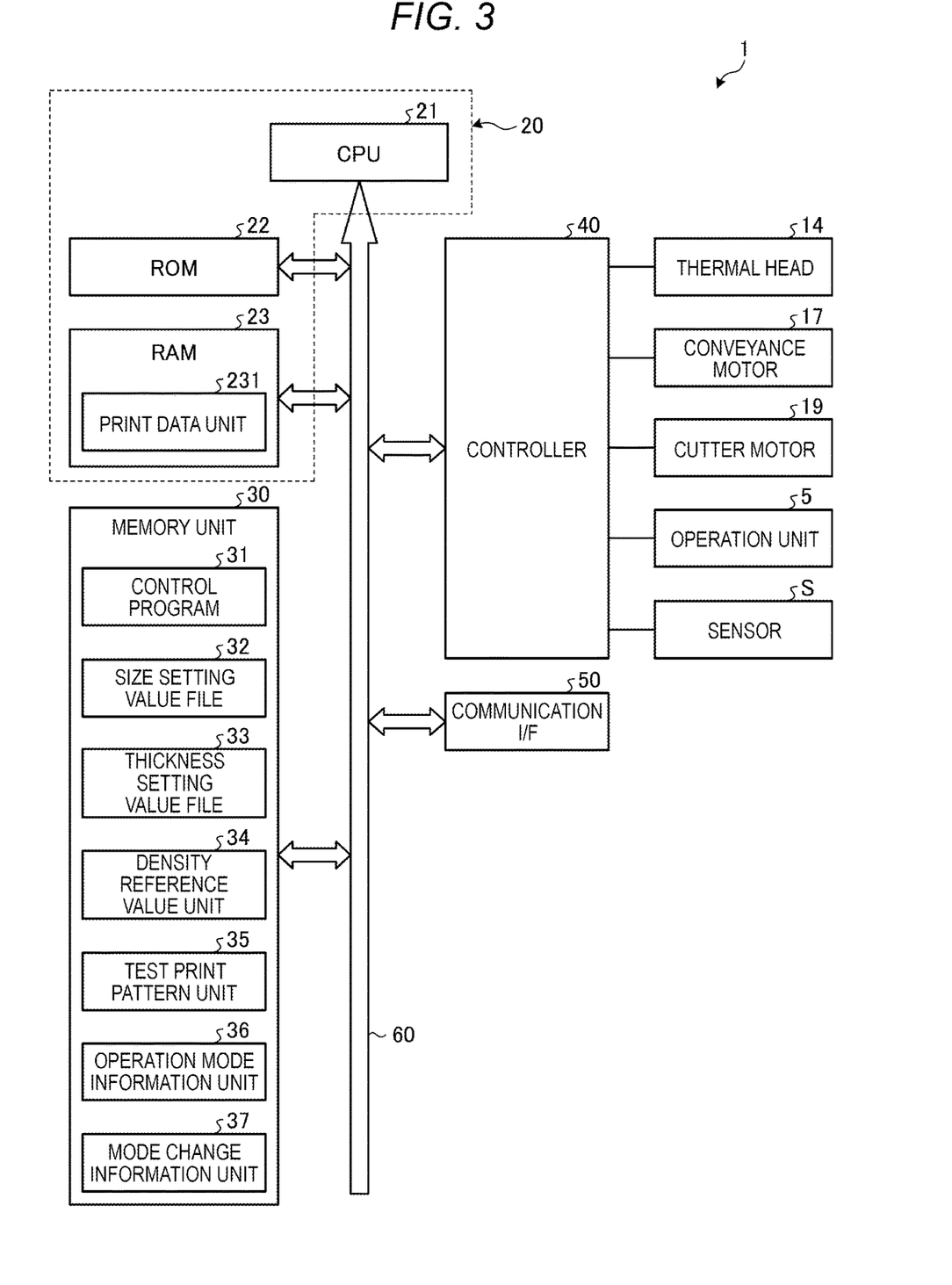
FIG. 3 is a block diagram illustrating a hardware configuration of the printer, according to an exemplary embodiment.

Subsequently, a hardware configuration of the printer 1 is described. FIG. 3 is a block diagram illustrating a hardware configuration of the printer 1, according to an exemplary embodiment. The printer 1 includes a control unit 20, a memory unit 30, an input and output controller 40, a communication I/F (Interface) 50, and the like. The control unit 20, the memory unit 30, the input and output controller 40, and the communication I/F 50 are connected to each other via a bus 60.

The control unit 20 is a computer including a central processing unit (CPU) 21 (e.g., a processor, a microprocessor, etc.), a read only memory (ROM) 22, and a random access memory (RAM) 23. The CPU 21, the ROM 22, and the RAM 23 are connected to each other via the bus 60.

The CPU 21 controls the operation of the entire printer 1. The ROM 22 stores various programs such as a program used for driving the CPU 21, or various kinds of data. The RAM 23 includes a print data unit 231. The print data unit 231 stores the print data, setting conditions relating to the print data, and the like received from the POS terminal. The setting conditions stored in the print data unit 231 include setting values such as the sizes of characters and the thicknesses of characters. The sizes of characters and the thicknesses of characters can be set for each character. The setting condition may be stored by the operation of the operation unit 5 instead of being received from the POS terminal. In addition, the RAM 23 is used as a work area of the CPU 21, and various program or various kinds of data stored in the ROM 22 or the memory unit 30 may be loaded into the RAM 23. The control unit 20 performs various control processes of the printer 1 by the CPU 21 operating according to the control program that is stored in the ROM 22 or the memory unit 30 and loaded into the RAM 23.

The memory unit 30 is configured with a storage medium such as a hard disk drive (HDD) or a flash memory and thus maintains stored contents even if the power is cut off. The memory unit 30 stores a control program 31, a size setting value file 32, a thickness setting value file 33, a density reference value unit 34, a test printing pattern unit 35, an operation mode information unit 36, and a mode change information unit 37.

The control program 31 is a control program for dispensing a receipt by acquiring the print data from the POS terminal and printing the print data on the paper 16, a program for setting an operation mode of the printing unit based on the result of the test printing, or the like. The control program 31 includes various other control programs.

Figure 4:
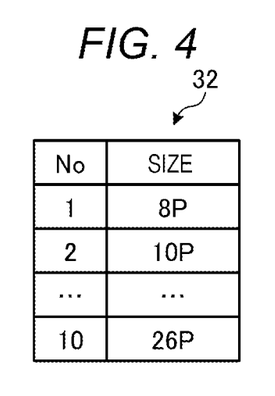
FIG. 4 is a diagram illustrating data in a size setting value unit that is stored in a memory unit of the printer, according to an exemplary embodiment.

The size setting value file 32 stores the sizes of characters that can be set if the print data is printed. FIG. 4 is a diagram illustrating data of the size setting value file 32. Referring to FIG. 4, in the data stored in the size setting value file 32, "No" and data indicating the size are associated with each other.

Referring to FIG. 4, in the "No" column, a number for specifying the size of a character is stored. In the size column, settable sizes of the character are stored. According to the present embodiment, a size of the character can be set in 10 stages, by 8 points to 26 points in 2-point increments.

Figure 5:
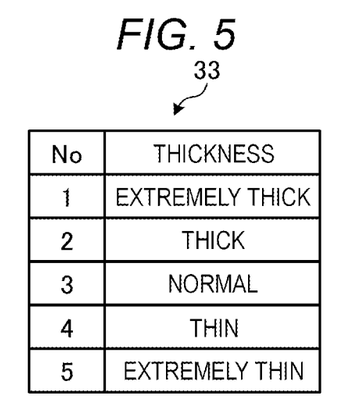
FIG. 5 is a diagram illustrating data in a thickness setting value unit that is stored in the memory unit of the printer, according to an exemplary embodiment.

FIG. 5 is a diagram illustrating data in the thickness setting value file 33. In a thickness setting value file 33, the settable thicknesses of the character if the print data is printed are stored. In the data stored in the thickness setting value file 33, "No" and data indicating the thickness are associated with each other.

In the "No" column, a number for specifying the thickness of the character is stored. In the thickness column, settable thicknesses of the character are stored. According to the present embodiment, a thickness of the character can be set in five stages from "extremely thick" to "extremely thin".

Figure 6:
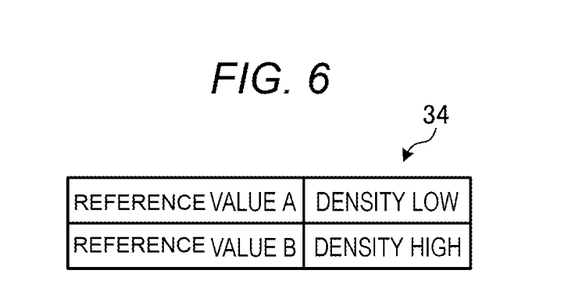
FIG. 6 is a diagram illustrating data in a density reference value unit that is stored in the memory unit of the printer, according to an exemplary embodiment.

FIG. 6 is a diagram illustrating data in the density reference value unit 34. The density reference value unit 34 stores the reference value of the printing density to be compared with the printing density of the test-printed printing pattern. The density reference value unit 34 stores a reference value A indicating a low density and a reference value B indicating a density higher than the reference value A. The reference value A is used for determining whether the printing pattern is printed. The reference value B is used for determining whether the printed printing pattern has a constant print quality. Here, the constant print quality means a printing density in which printed characters can be visually recognized easily.

The test printing pattern unit 35 stores the printing pattern (print data) to be test-printed. The printing pattern is print data for test printing that is set in advance and is, for example, print data for so-called solid black printing, in which a predetermined area is printed in black. The printing pattern may be print data for printing characters.

Figure 7:
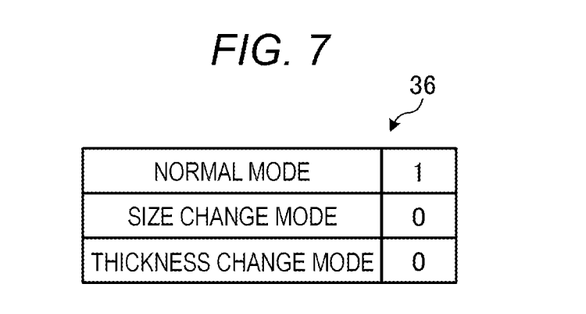
FIG. 7 is a diagram illustrating data in an operation mode information unit that is stored in the memory unit of the printer, according to an exemplary embodiment.

FIG. 7 is a diagram illustrating data in the operation mode information unit 36. The operation mode information unit 36 stores the set operation mode of the printing unit. The operation mode information unit 36 stores data indicating operation modes of the printing unit and flags in an associated manner.

In particular embodiments, the operation modes are a normal mode, a size change mode, and a thickness change mode. The normal mode is an operation mode for printing print data with the size of the character and the thickness of the character designated by the POS terminal or the printer 1. The size change mode is an operation mode for printing the print data by increasing a designated size of a character. The thickness change mode is an operation mode for printing the print data by increasing a designated thickness of a character. In the example of FIG. 7, a flag of the normal mode is set to "1", and thus the printing unit prints in the normal mode in this state. The flag is rewritten by the control unit 20 in response to the operation of the operation unit 5 or in response to the output from the sensor S.

Figure 8:
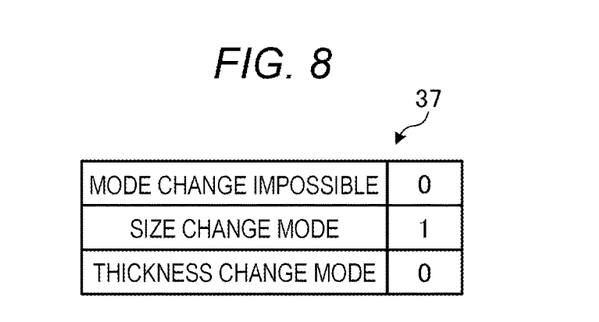
FIG. 8 is a diagram illustrating data in a mode change information unit that is stored in the memory unit of the printer, according to an exemplary embodiment.

FIG. 8 is a diagram illustrating data in the mode change information unit 37. The mode change information unit 37 stores data for setting the operation mode that is changed if the constant print quality cannot be obtained in the test printing performed in the normal mode (hereinafter, simply referred to as a "changed operation mode"). The mode change information unit 37 stores data indicating changed operation modes and flags in an associated manner.

For example, if "1" is stored in a mode change impossible flag, the normal mode is maintained without a mode change even if the constant print quality is not obtained in the test printing. If the user desires to visually check the result of the test printing and change the operation mode by his or her own determination or the like, "1" is stored in the mode change impossible flag by the operation of the user. As illustrated in FIG. 8, if "1" is stored in the flag of the size change mode, the changed operation mode becomes the size change mode. In addition, if "1" is stored in the flag of the thickness change mode, the changed operation mode becomes the thickness change mode. The flag is rewritten by the control unit 20 in response to the operation of the operation unit 5.

Referring back to FIG. 3, the description of the hardware configuration of the printer 1 is continued. The input and output controller 40 is connected to the thermal head 14, the conveyance motor 17, the cutter motor 19, the operation unit 5, and the sensor S. The input and output controller 40 includes a function as an input and output interface with respect to each connected hardware and a function for controlling the hardware. Accordingly, the control unit 20 can transmit and receive information (data) respectively to and from the thermal head 14, the conveyance motor 17, the cutter motor 19, the operation unit 5, and the sensor S via the input and output controller 40, and also can control the hardware based on the instruction of the control unit 20. The communication I/F 50 is an interface for communication with the POS terminal and the like that are external devices.

Figure 9:
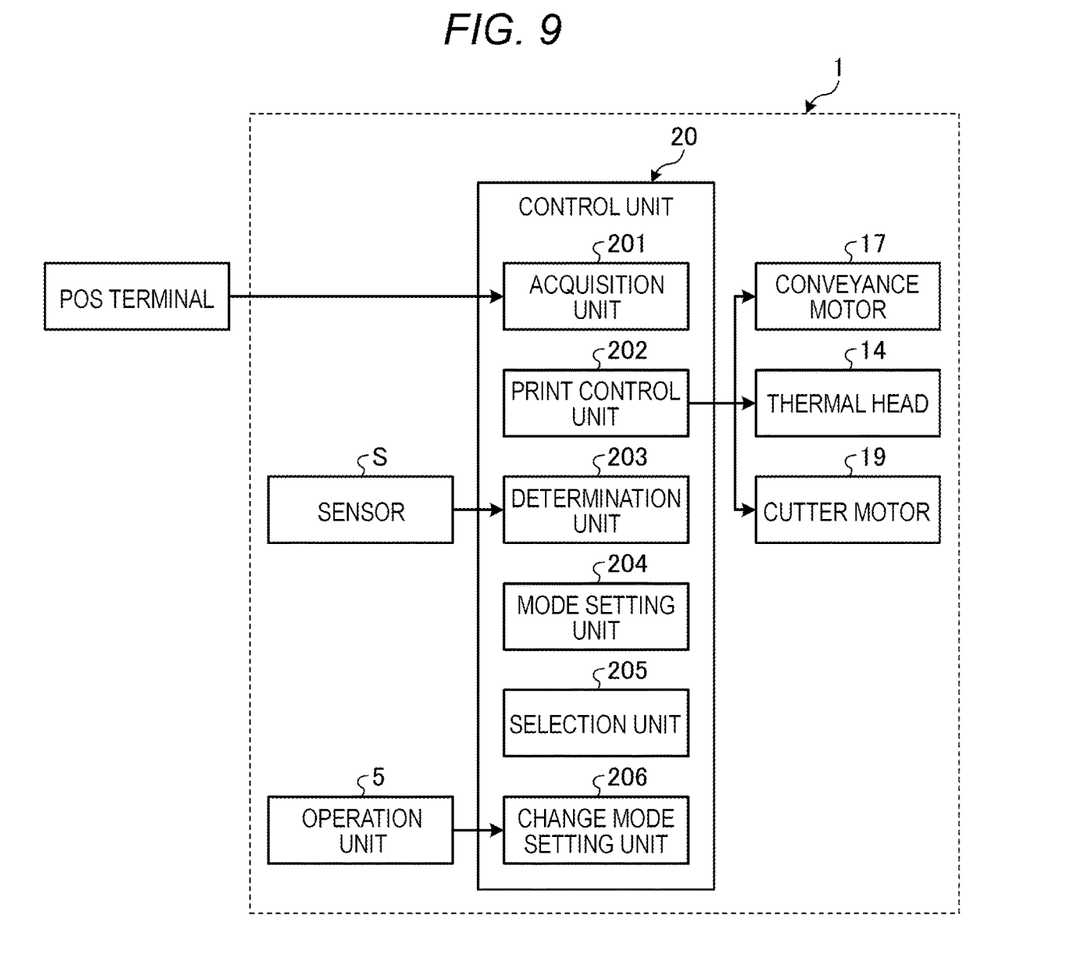
FIG. 9 is a block diagram illustrating a configuration of a control unit of the printer, according to an exemplary embodiment.

Subsequently, the configuration of functions of the printer 1 is described. FIG. 9 is a block diagram illustrating an example of the configuration of the printer 1. The control unit 20 functions as an acquisition unit 201, a print control unit 202, a determination unit 203, a mode setting unit 204, a selection unit 205, and a change mode setting unit 206 by the operation of the CPU 21 according to the control program stored in the ROM 22 or the memory unit 30. In addition, these functions may be configured by hardware such as dedicated circuits.

The acquisition unit 201 acquires print data. Specifically, the acquisition unit 201 acquires print data such as transaction data, store logo data, and advertisement data from the POS terminal. The acquisition unit 201 stores the provided print data in the print data unit 231. At this point, the acquisition unit 201 also stores printing setting conditions that are provided from the POS terminal or designated by the operation of the operation unit 5 in the print data unit 231. The printing setting conditions include the size of the character, the thickness of the character, and the like.

The print control unit 202 controls the printing units including the conveyance motor 17, the thermal head 14, the cutter motor 19, and the like to print on the paper 16. For example, the print control unit 202 controls the printing unit and prints the print data stored in the print data unit 231 on the paper 16. In addition, the print control unit 202 controls the printing unit to print the printing pattern set in advance on the medium. Specifically, the print control unit 202 performs test printing by controlling the thermal head 14 and the like to print the printing pattern stored in the test printing pattern unit 35 on the paper 16.

The print control unit 202 activates the sensor S when performing the test printing. The print control unit 202 is an example of a test printing control unit that controls the printing units to print the printing pattern set in advance on the paper 16.

The determination unit 203 determinates whether a printing density of the test printing pattern is lower than a printing density set in advance. Specifically, the determination unit 203 determinates whether the printing density of the test printing pattern detected by the sensor S is lower than the reference value B that is stored in the density reference value unit 34. The reference value B is an example of the printing density set in advance. In addition, the determination unit 203 determinates whether the printing density of the test printing pattern that is detected by the sensor S is lower than the reference value A that is stored in the density reference value unit 34.

If the printing density detected by the sensor S is lower than the printing density set in advance, the mode setting unit 204 sets the operation mode of the printing unit to the size change mode. Specifically, if the determination unit 203 determines that the printing density of the test printing pattern printed in the normal mode is lower than the reference value B, the mode setting unit 204 rewrites the flag of the normal mode of the operation mode information unit 36 to "0" and rewrites the flag of the size change mode to "1". Accordingly, the operation mode of the printing unit is switched from the normal mode to the size change mode. In addition, this switching is performed in the condition that "1" is stored in the flag of the size change mode of the mode change information unit 37.

In addition, if the printing density detected by the sensor S is lower than the printing density set in advance, the mode setting unit 204 sets the operation mode of the printing unit to the thickness change mode. Specifically, if the determination unit 203 determines that the printing density of the test printing pattern printed in the normal mode is lower than the reference value B, the mode setting unit 204 rewrites the flag of the normal mode of the operation mode information unit 36 to "0" and the flag of the thickness change mode to "1". Accordingly, the operation mode of the printing unit is switched from the normal mode to the thickness change mode. In addition, this switching is performed when "1" is stored in the flag of the thickness change mode of the mode change information unit 37.

In particular embodiments, the selection unit 205 selects the size of the character to be printed in the size change mode from the sizes of the characters stored in the size setting value file 32. Specifically, the selection unit 205 selects the size of the character that is one step higher than the size of the character stored in the print data unit 231 as the setting condition for the printing in the size change mode from the size setting value file 32. Also, the print data is printed with the selected size of the character.

In particular embodiments, the selection unit 205 selects the thickness of the character to be printed in the thickness change mode from the thicknesses of the characters stored in the thickness setting value file 33. Specifically, the selection unit 205 selects the thickness of the character one step higher than the thickness of the character stored in the print data unit 231 as the setting condition for the printing in the thickness change mode from the thickness setting value file 33. Also, the print data is printed with the selected thickness of the character.

The change mode setting unit 206 rewrites the flag of the mode change information unit 37 in response to the operation of the operation unit 5. For example, the change mode setting unit 206 stores "1" in the mode change impossible flag of the mode change information unit 37 in response to the operation of the operation unit 5. Accordingly, regardless of the printing density of the test printing pattern detected by the sensor S, the operation mode is not changed from the normal mode. In other words, even if the printing density of the test printing pattern detected by the sensor S is lower than the reference value B, the change mode setting unit 206 can prohibit the switching of the operation mode by the mode setting unit 204. The change mode setting unit 206 is an example of a prohibiting unit. In addition, if the change mode setting unit 206 stores "1" in any flag of the mode change information unit 37, "0" is stored in the other flags.

Figure 10:
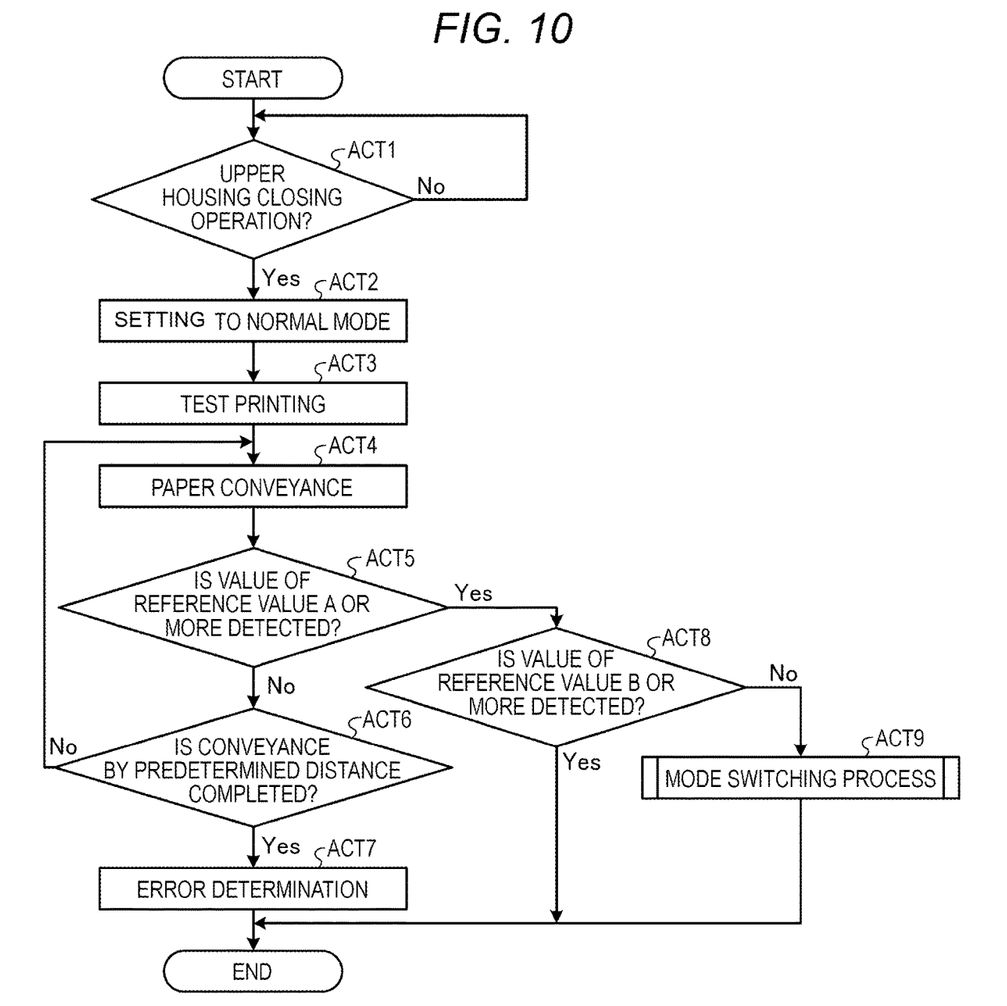
FIG. 10 is a flowchart illustrating a paper determination process by the control unit of the printer, according to an exemplary embodiment.

FIG. 10 is a flowchart illustrating a paper determination process performed by the control unit 20, according to an exemplary embodiment. Subsequently, the paper determination process performed by the control unit 20 of the printer 1 is described. The paper determination process is performed if new paper 16 is set into the printer 1 for replacing the paper 16, but may be performed at any time.

Referring to FIG. 10, the control unit 20 determines whether a closing operation is performed on the upper housing 2 (ACT 1). The closing operation of the upper housing 2 is detected, for example, by a detection switch (not illustrated) that is provided in the lower housing 3 and is turned on in a state in which the upper housing 2 is closed. According to the present embodiment, it is considered that the new paper 16 is set by detecting the closing operation of the upper housing 2. In addition, the control unit 20 may detect the operation of the operation unit 5 instead of the detection of the closing operation of the upper housing 2, or it may be considered that new paper 16 is set by detecting both states simultaneously occurring. If the closing operation of the upper housing 2 is not detected (No in ACT 1), the control unit 20 returns to the process of ACT 1 and stands by.

If the closing operation of the upper housing 2 is detected (Yes in ACT 1), the mode setting unit 204 sets the operation mode of the printing unit to the normal mode (ACT 2). The mode setting unit 204 stores "1" in the flag of the normal mode of the operation mode information unit 36 to set the operation mode to the normal mode.

Subsequently, the print control unit 202 controls the thermal head 14, the conveyance motor 17, and the like to perform test printing (ACT 3). The print data printed in the test printing is read from the test printing pattern unit 35. The print control unit 202 controls the conveyance motor 17 and conveys the test-printed paper 16 (ACT 4).

The determination unit 203 determines whether the sensor S detects the printing density of the reference value A or more (ACT 5). If the sensor S does not detect the printing density of the reference value A or more (No in ACT 5), the control unit 20 determines whether the paper 16 is conveyed by a predetermined distance after the test printing (ACT 6). If the paper 16 is not conveyed by the predetermined distance (No in ACT 6), the control unit 20 returns to the process of ACT 4. Here, the predetermined distance is a distance the printed test printing pattern travels to a detection position of the sensor S. If the paper 16 is conveyed by the predetermined distance after the test printing (Yes in ACT 6), the control unit 20 determinates that the test printing is in error (ACT 7) and ends the paper determination process.

If the sensor S detects the printing density of the reference value A or more (Yes in ACT 5), the determination unit 203 determines whether the sensor S detects the printing density of the reference value B or more (ACT 8). If the sensor S detects the printing density of the reference value B or more (Yes in ACT 8), the control unit 20 ends the paper determination process. That is, the control unit 20 determines the desired printing density can be obtained even if printing is performed in the normal mode on the set paper 16, the visibility of the printed character is satisfactory, and thus the paper determination process is ended. If the sensor S does not detect the printing density of the reference value B or more (No in ACT 8), the mode setting unit 204 performs the mode switching process (ACT 9).

Figure 11:
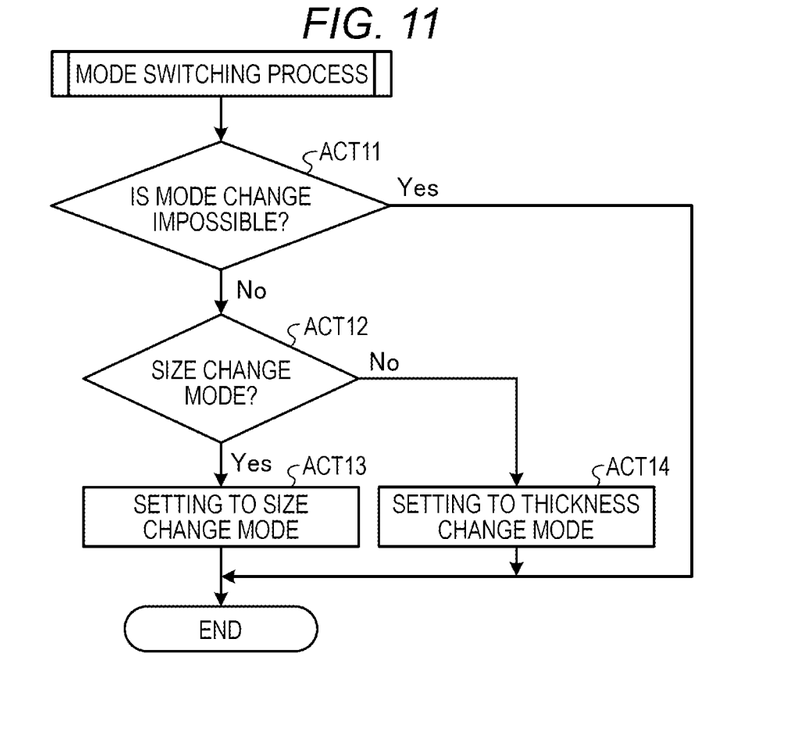
FIG. 11 is a flowchart illustrating a mode switching process by the control unit of the printer, according to an exemplary embodiment.

Subsequently, the mode switching process is described. FIG. 11 is a flowchart illustrating a mode switching process by the control unit 20, according to an exemplary embodiment.

The mode setting unit 204 determines whether "1" is stored in the mode change impossible flag of the mode change information unit 37 (ACT 11). If "1" is stored in the mode change impossible flag (Yes in ACT 11), the mode switching process ends. That is, if the automatic change of the operation mode in response to the result of the test printing is prohibited by the user, the mode setting unit 204 does not switch the operation mode. Then, the control unit 20 ends the mode switching process.

If "1" is not stored in the mode change impossible flag (No in ACT 11), the mode setting unit 204 determines whether "1" is stored in the flag of the size change mode of the mode change information unit 37 (ACT 12). If "1" is stored in the flag of the size change mode (Yes in ACT 12), the mode setting unit 204 sets the operation mode to the size change mode (ACT 13). The mode setting unit 204 sets the operation mode to the size change mode by storing "1" in the flag of the size change mode of the operation mode information unit 36. Then, the control unit 20 ends the mode switching process.

If "1" is not stored in the flag of the size change mode (No in ACT 12), the mode setting unit 204 sets the operation mode to the thickness change mode (ACT 14). The mode setting unit 204 sets the operation mode to the thickness change mode by storing "1" in the flag of the thickness change mode of the operation mode information unit 36. Then, the control unit 20 ends the mode switching process.

Figure 12:
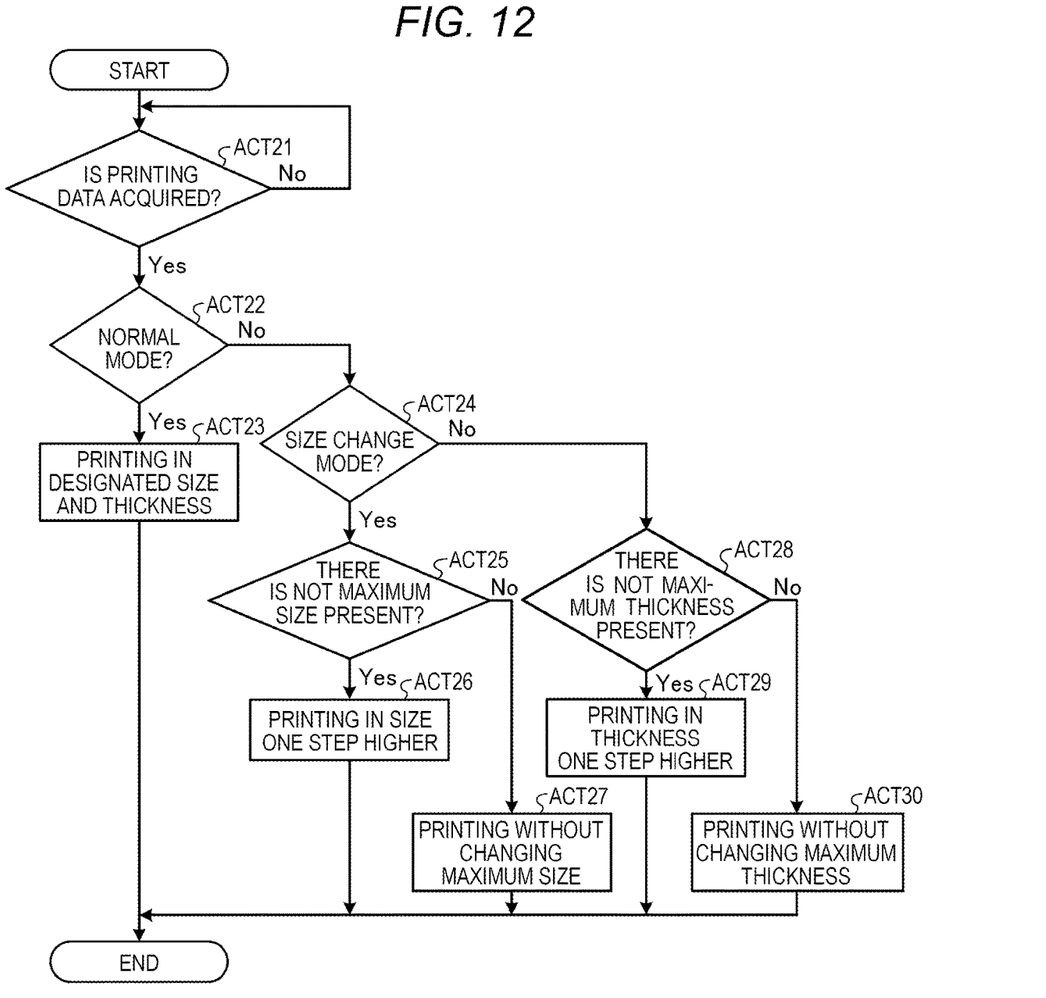
FIG. 12 is a flowchart illustrating a printing process by the control unit of the printer, according to an exemplary embodiment.

The printing process performed by the control unit 20 of the printer 1 is described. FIG. 12 is a flowchart illustrating a printing process by the control unit 20 of the printer 1, according to an exemplary embodiment. The printing process is performed based on the receipt printing instruction received from the POS terminal.

The control unit 20 determines whether the acquisition unit 201 acquires the print data from the POS terminal together with the receipt printing instruction (ACT 21). If the print data is not acquired (No in ACT 21), the control unit 20 returns to the process of ACT 21 and stands by. If the acquisition unit 201 acquires the print data (Yes in ACT 21), the print control unit 202 determines whether the operation mode is set to the normal mode (ACT 22). The print control unit 202 performs the above-mentioned determination by determining whether "1" is stored in the flag of the normal mode of the operation mode information unit 36.

If the operation mode is set to the normal mode (Yes in ACT 22), the print control unit 202 prints the print data stored in the print data unit 231 with the designated size and thickness (ACT 23). Then, the control unit 20 ends the printing process.

In the process of ACT 22, if the operation mode is not set to the normal mode (No in ACT 22), the print control unit 202 determines whether the operation mode is set to the size change mode (ACT 24). The print control unit 202 performs the above-mentioned determination by determining whether "1" is stored in the flag of the size change mode of the operation mode information unit 36.

If the operation mode is set to the size change mode (Yes in ACT 24), the print control unit 202 determines whether there is a character set to a maximum size in the print data (ACT 25). If there is not a character set to the maximum size (Yes in ACT 25), the print control unit 202 prints the print data with the size of the character being one step higher than the designated size of the character in the size setting value file 32 (ACT 26). Then, the control unit 20 ends the printing process.

If there is a character set to the maximum size (No in ACT 25), the print control unit 202 prints the print data so that the character designated to the maximum size is with the designated size of the character, and the other characters are with the size of the character one step higher than the designated size of the character (ACT 27). Then, the control unit 20 ends the printing process.

In the process of ACT 24, if the operation mode is not set to the size change mode (No in ACT 24), the print control unit 202 determines whether there is a character set to the maximum thickness in the print data (ACT 28). If there is not a character set to the maximum size (Yes in ACT 28), the print control unit 202 prints the print data with the thickness being one step higher than the designated thickness of the character in the thickness setting value file 33 (ACT 29). Then, the control unit 20 ends the printing process.

If there is a character set to the maximum thickness (No in ACT 28), the print control unit 202 prints the print data so that the character designated to the maximum thickness is with the designated thickness of the character, and the other characters are with the thickness of the character one step higher than the designated thickness of the character (ACT 30). Then, the control unit 20 ends the printing process.

In the present embodiment, if the print data includes a printing target other than a character, for example, a figure (e.g., an image, etc.), the print control unit 202 prints the figure with a separately designated thickness of a line, regardless of the set operation mode. However, if the operation mode is set to the thickness change mode, the print control unit 202 may print the figure with the thickness of the line that is thicker than the designated thickness of the line.

Figure 13:
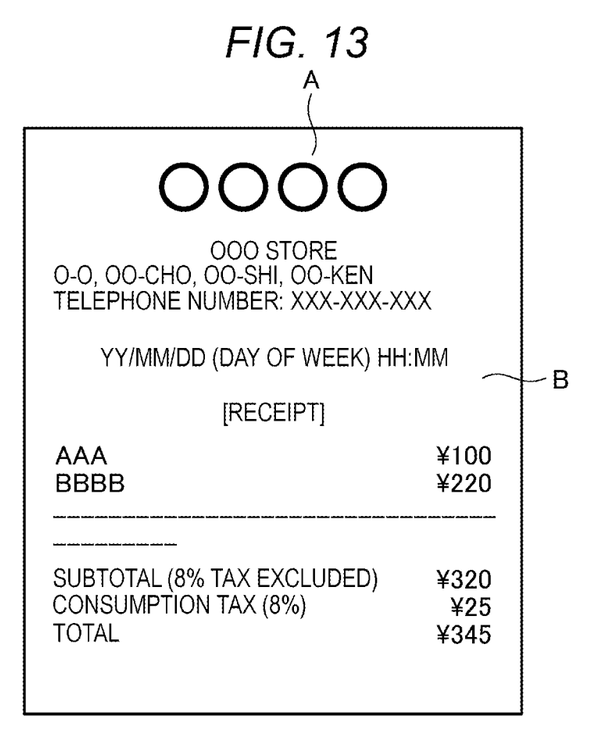
FIG. 13 is a diagram illustrating a printing result in a normal mode of the printer, according to an exemplary embodiment.
Figure 14:
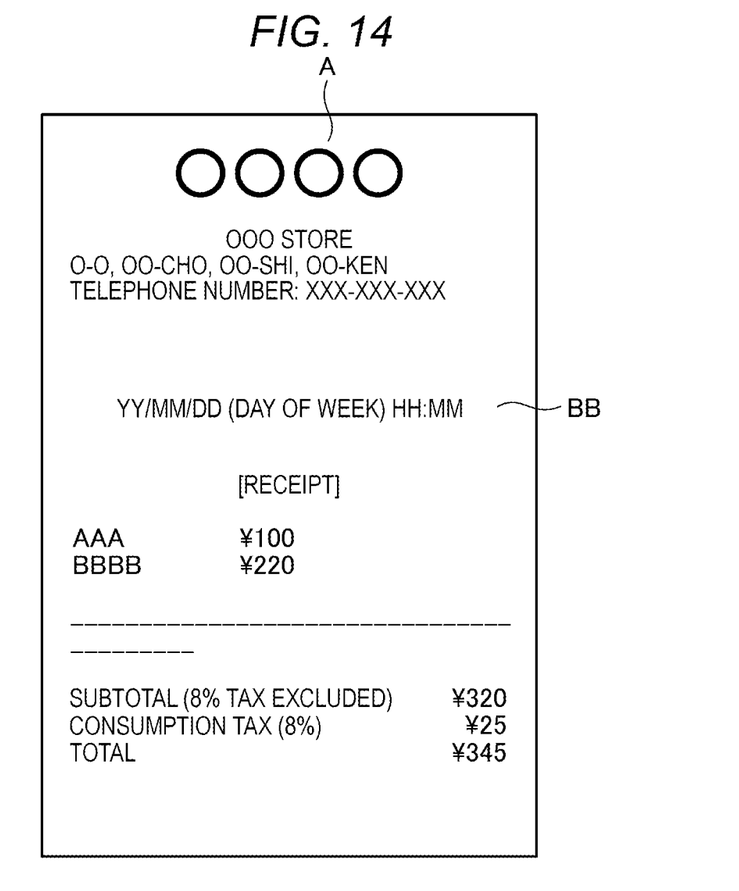
FIG. 14 is a diagram illustrating a printing result in a size change mode of the printer, according to an exemplary embodiment.
Figure 15:
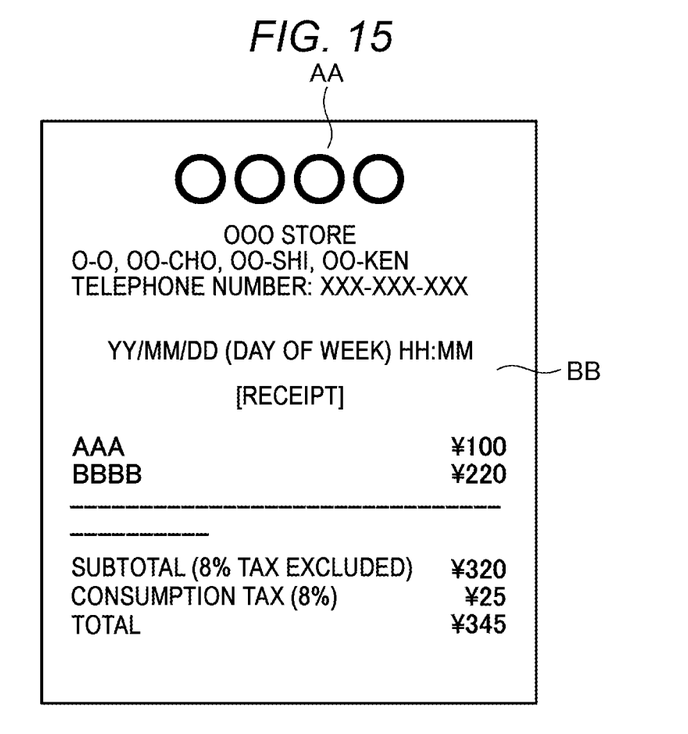
FIG. 15 is a diagram illustrating a printing result in a thickness change mode of the printer, according to an exemplary embodiment.

FIG. 13 is an example of a receipt printed in the normal mode, according to an exemplary embodiment. FIG. 14 is an example of a receipt obtained by printing the print data that is the same as that of the receipt of FIG. 13 in the size change mode. FIG. 15 is an example of a receipt obtained by printing the print data that is the same as that of the receipt of FIG. 13 in the thickness change mode.

In the receipt illustrated in FIG. 13, characters A of the company name printed in the uppermost portion are set to the maximum size of "26 P", and other characters B are set to "10 P". In the receipt illustrated in FIG. 14 in which the print data is printed in the size change mode, the characters A of the company name printed in the uppermost portion are set to "26 P" as in the normal mode, and the other characters BB are set to "12 P" one step higher than in the normal mode. In addition, the thickness of all the characters in the receipt illustrated in FIG. 14 is "normal" like the characters in the receipt illustrated in FIG. 13.

In the receipt illustrated in FIG. 15 obtained by printing the print data that is the same as that in the receipt illustrated in FIG. 13 in the thickness change mode, characters AA of the company name printed in the uppermost portion and the other characters BB are set to "thick" that is one step thicker than that in the normal mode. The sizes of all the characters in the receipt illustrated in FIG. 15 are the same as those of the characters in the receipt illustrated in FIG. 13.

In the size change mode, if the characters do not fit into the width of the paper 16 if the sizes of the characters are increased, the print control unit 202 prints without changing the sizes of the characters or notifies an error. Meanwhile, in the size change mode, if the dispensed receipt becomes long if the sizes of the characters increase, the print control unit 202 prints with the sizes of the characters increased. As a result, the dispensed receipt becomes long. The same applies in the thickness change mode. That is, the print control unit 202 increases the sizes of the characters in the printable range of the paper, in the size change mode. Similarly, the print control unit 202 increases the thicknesses of the characters in the printable range of the paper, in the thickness change mode.

As described above, the printer 1 according to the present embodiment includes the acquisition unit 201 that acquires print data, a printing unit including the thermal head 14 that can operate in a normal mode in which the print data is printed on the paper 16 with the designated size of the character and a size change mode in which the print data is printed on the paper 16 with the designated size of the character increased, the print control unit 202 that controls the printing unit and prints the printing pattern set in advance on the paper 16, the sensor S that detects the printing density of the printing pattern printed on the paper 16 by the print control unit 202, and the mode setting unit 204 that sets the operation mode of the printing unit to the size change mode if the printing density detected by the sensor S is lower than the reference value B that is set in advance.

In addition, the printer 1 according to the present embodiment includes the acquisition unit 201 that acquires print data, a printing unit including the thermal head 14 that can operate in a normal mode in which the print data is printed on the paper 16 with the designated thickness of the character and a thickness change mode in which the print data is printed on the paper 16 with the designated thickness of the character increased, the print control unit 202 that controls the printing unit and prints the printing pattern set in advance on the paper 16, the sensor S that detects the printing density of the printing pattern printed on the paper 16 by the print control unit 202, and the mode setting unit 204 that sets the operation mode of the printing unit to the thickness change mode if the printing density detected by the sensor S is lower than the reference value B that is set in advance.

Accordingly, the printer 1 can print with changing the designated size or thickness of the character in response to the paper 16 used. Therefore, the printer 1 can improve the visibility of the character regardless of the type of the paper 16 used. Further, the printer 1 does not have to control the temperature of the thermal head 14 or the like for causing the printing density to be constant, and thus visibility of the character can be easily improved.

Further, the printer 1 according to the present embodiment further includes the size setting value file 32 that stores a plurality of sizes of characters that can be designated in the normal mode, and the selection unit 205 that selects a size of a character to be printed in the size change mode from the sizes of the characters stored in the size setting value file 32.

In addition, the printer 1 according to the present embodiment includes the thickness setting value file 33 that stores a plurality of thicknesses of characters that can be designated in the normal mode, and the selection unit 205 that selects a thickness of a character to be printed in the thickness change mode from the thicknesses of the characters stored in the thickness setting value file 33.

Accordingly, the printer 1 can perform the size change mode or the thickness change mode by using the size of the character or the thickness of the character that can be set in the normal mode. Therefore, the printer 1 does not have to set a size of a character dedicated to the size change mode and a thickness of a character dedicated to the thickness change mode, and can easily print in the size change mode or the thickness change mode.

Also, the printer 1 according to the present embodiment further includes the change mode setting unit 206 that prohibits the switching of the operation mode by the mode setting unit 204 which is performed if the printing density detected by the sensor S is lower than the reference value B set in advance.

Accordingly, the user of the printer 1 can look at the result of the test printing and determine whether to change the operation mode. Therefore, usability of the printer 1 can be improved.

In addition, the printer 1 according to the present embodiment further includes the operation unit 5 that can manually switch the operation mode of the printing unit.

Accordingly, the user of the printer 1 can look at a result of the test printing and freely set the operation mode. Therefore, the usability of the printer 1 can be further improved.

While certain embodiments have been described, these embodiments have been presented by way of example only, and are not intended to limit the scope of the present disclosure. Indeed, the exemplary, non-limiting embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the present disclosure.

For example, according to the present embodiment, in the size change mode, printing is performed with the designated size of the character to be the size of the character one step higher, in the size setting value file 32. However, the method of changing the size of the character is not limited thereto. For example, the designated size of the character may be set to the size of the character two steps higher, in the size setting value file 32, or may be set to the size of the character obtained by multiplying the designated size of the character by a coefficient. Similarly, in the thickness change mode, the designated thickness of the character may be set to the thickness of the character two steps higher, in the thickness setting value file 33.

What is claimed is:

1. A printer comprising:
a printer head configured to operate in a normal mode for printing print data on a medium with at least one of a designated size or a designated thickness of a character, and a size change mode or a thickness change mode for printing the print data on the medium with a size or thickness of the character being greater than the designated size or the designated thickness, respectively;
a sensor configured to detect a printing density of a printing pattern printed on the medium; and
a processor configured to
acquire print data,
control the printer head and print the printing pattern on the medium, the printing pattern being set in advance,
in response to detecting the printing density being lower than a printing density set in advance, set an operation mode of the printer head to one of the size change mode or the thickness change mode,
in size change mode, determine whether there is a character set to a maximum size in the print data, and when there is a character set to a maximum size, print the print data so that the character designated to have the maximum size is of the designated size of the character, and characters other than the designated character have a character size one step higher than the designated size of the character, and
in thickness change mode, determine whether there is a character set to a maximum thickness in the print data, and when there is a character set to a maximum thickness, print the print data so that the character designated to have the maximum thickness is of the designated thickness of the character, and characters other than the designated character have a thickness of the character one step higher than the designated thickness of the character.

2. The printer according to claim 1, wherein the processor is further configured to
store a plurality of sizes and a plurality of thicknesses of the characters designated in the normal mode; and
select the size or the thickness of the character to be printed in the size change mode or the thickness change mode, respectively, from the stored plurality of sizes or the plurality of thicknesses.

3. The printer according to claim 1, wherein the processor is further configured to
prevent switching of the operation mode.

4. The printer according to claim 1, wherein the processor is further configured to
cause an operation for manually switching the operation mode of the printer head.

5. A method for controlling a printer having a printer head, a sensor, and a processor, the method comprising:
operating the printer head in a normal mode for printing print data on a medium with at least one of a designated size or a designated thickness of a character, or operating the printer head in one of a size change mode or a thickness change mode for printing the print data on the medium with a size or thickness of the character being greater than the designated size or the designated thickness, respectively;

detecting, by the sensor, a printing density of a printing pattern printed on the medium;

acquiring, by the processor, print data;

controlling, by the processor, the printer head and printing the printing pattern on the medium, the printing pattern being set in advance;

in response to detecting the printing density being lower than a printing density set in advance, setting, by the processor, an operation mode of the printer head to one of the size change mode or the thickness change mode;

in size change mode, determining whether there is a character set to a maximum size in the print data, and when there is a character set to a maximum size, printing the print data so that the character designated to have the maximum size is of the designated size of the character, and characters other than the designated character have a character size one step higher than the designated size of the character; and in thickness change mode, determining whether there is a character set to a maximum thickness in the print data, and when there is a character set to a maximum thickness, printing the print data so that the character designated to have the maximum thickness is of the designated thickness of the character, and characters other than the designated character have a thickness of the character one step higher than the designated thickness of the character.

6. The method according to claim 5, further comprising:

storing, by the processor, a plurality of sizes and a plurality of thicknesses of the characters designated in the normal mode; and selecting, by the processor, the size or the thickness of the character to be printed in the size change mode or the thickness change mode, respectively, from the stored plurality of sizes or the plurality of thicknesses.

7. The method according to claim 5, further comprising:

preventing, by the processor, switching of the operation mode.

8. The method according to claim 5, further comprising:

causing an operation, by the processor, for manually switching the operation mode of the printer head.

9. A non-transitory computer readable medium configured to store instructions, which, when executed by a processor, cause operations to be carried out, the operations comprising:

operating the printer head in a normal mode for printing print data on a medium with at least one of a designated size or a designated thickness of a character, or operating the printer head in one of a size change mode or a thickness change mode for printing the print data on the medium with a size or thickness of the character being greater than the designated size or the designated thickness, respectively;

detecting, by the sensor, a printing density of a printing pattern printed on the medium;

acquiring, by the processor, print data;

controlling, by the processor, the printer head and printing the printing pattern on the medium, the printing pattern being set in advance; and in response to detecting the printing density being lower than a printing density set in advance, setting, by the processor, an operation mode of the printer head to one of the size change mode or the thickness change mode, in size change mode, determining whether there is a character set to a maximum size in the print data, and when there is a character set to a maximum size, printing the print data so that the character designated to have the maximum size is of the designated size of the character, and characters other than the designated character have a character size one step higher than the designated size of the character, and in thickness change mode, determining whether there is a character set to a maximum thickness in the print data, and when there is a character set to a maximum thickness, printing the print data so that the character designated to have the maximum thickness is of the designated thickness of the character, and characters other than the designated character have a thickness of the character one step higher than the designated thickness of the character.

\* \* \* \* \*